April 2, 1968  D. HEDERMANN  3,375,660
HYDRAULIC STEERING CONTROL UNIT FOR AUTOMOTIVE VEHICLES
Filed Sept. 21, 1966  3 Sheets-Sheet 1

INVENTOR
DIETER HEDERMANN

INVENTOR
DIETER HEDERMANN

United States Patent Office 3,375,660
Patented Apr. 2, 1968

3,375,660
HYDRAULIC STEERING CONTROL UNIT FOR AUTOMOTIVE VEHICLES
Dieter Hedermann, Immenstaad, Germany, assignor to Robert Bosch GmbH, Stuttgart, Germany, a limited-liability company of Germany
Filed Sept. 21, 1966, Ser. No. 581,059
Claims priority, application Germany, Nov. 26, 1965, 84,698
11 Claims. (Cl. 60—52)

The present invention relates to a control unit for a hydraulic steering arrangement for automotive vehicles, and more particularly to a control unit to supply, or control supply of hydraulic fluid under pressure to an operating power piston-cylinder arrangement connected to the steered wheels of an automotive vehicle to enable steering without any mechanical linkage of the steering wheel, or steering column with the wheels.

The economy of construction and safety of operation of automotive vehicles can be improved by connecting the steering wheel and its steering column directly to a hydraulic control unit, and then utilizing hydraulic pressure obtained from such a control unit selectively to operate a power piston which controls the steering of the wheels themselves. The elongated steering posts, customarily extending into the engine compartment of the vehicle can thus be eliminated; by controlling the supply of hydraulic pressure, derived from a pump driven by the engine, power assisted steering can at the same time be obtained. A hydraulic steering arrangement in which a cylinder pump is utilized as a hydraulic drive element, the displacement of a piston within the pump controlling oil pressure in lines directed to the hydraulic unit actuating the steering mechanism itself is disclosed in U.S. Patent 3,114,242, J. D. Allen. The suggested construction utilizes a number of valves, pressure conduits, and requires a substantial number of fluid tight fits.

It is an object of the present invention to provide a control unit for a hydraulically operated power piston-cylinder arrangement directly controlling the cut of the wheels, which is simple in construction, inexpensive, and requires but few seals or pressure tight joints; and further which enables selectively use with a source of pressure fluid, to provide power assisted steering or, selectively, enables direct steering without power assistance in case of failure of the pressure pump or of the engine.

Briefly, in accordance with the present invention, the hydraulic steering control unit has connections for a fluid pressure source, such as a pump customary for use with power steering units, and another pair of connections for a power cylinder-piston arrangement to directly control the steering of the wheels. A housing is provided, forming a cylinder closed at both ends, in which a piston is slidably arranged, the displacement of which is governed by the rotation of the steering wheel, or the steering column, for example by a threaded connection. A pair of chambers are provided within the cylinder on either side of the piston. When the vehicle is going straight, the size of the chambers is the same; upon turning of the steering wheel to cut the wheels, the piston is moved within the cylinder; thus setting up differential pressure in the chambers; this pressure is transmitted, differentially, to the power piston operating the wheel steering mechanism. The piston itself is formed with a bore, preferably a pair of bores, in axial direction. One of the bores contains a control valve body. The control valve body is slidable axially therein. The control valve body is formed as a control spool, with a plurality of fluid communication notches or recesses circumferentially formed therein; further, the spool has axial blind bores, and transverse bores communicating with the axial bores, in order to provide communication of fluid from the outside of the spool to the end thereof and thus to the chambers on either side of the piston. A valve body, slidable within the piston, has end faces which are exposed to the fluid pressure in the chambers, for example by being open thereto. The spool or valve body is movable between a neutral or central position axially within the piston against the forces of a spring. The piston and the housing are provided with fluid channels communicating with the fluid communication recesses or notches formed in the spool, and forming a first fluid circuit between the chambers and the power cylinder-piston arrangement acting on the wheel steering mechanism; a second fluid circuit is formed between the chambers, the power cylinder-piston arrangement and, in addition thereto, a fluid pressure source (and a low-pressure bypass in case of failure of the fluid pressure source). When the steering wheel is turned, the piston moves from a central, or balanced position to compress the fluid in one of the chambers. If the reaction force from the wheels is insufficient to cause displacement of the control valve body against the force of the spring, the valve body will stay in its neutral or center position and steering effort will be directly transmitted over the first fluid circuit from the chamber in which the hydraulic fluid is compressed, to the steering power cylinder-piston arrangement. If, however, the steering force is great enough to cause displacement of the control valve body against the force of the spring, an additional fluid circuit will be open to the source of fluid pressure, that is the power steering pump, in order to assist in pushing the piston in the direction in which displacement is desired, thus providing power assistance to the steering. In case of failure of the fluid pressure source, or if the engine is stopped (for example if the vehicle is being towed), a bypass valve is provided which shunts the fluid pressure source and enables steering of the vehicle by displacement of the piston by the steering wheel, by manual force.

Preferably a pair of leakage return valves are provided in the other bore of the piston, which leakage return valves can simultaneously function as over pressure relief and safety valves, as well as safety arrangements to prevent excessive cutting of the wheels with power assistance. These over pressure valves can be biased by another spring, the tension of which is adjustable and can be balanced against the pressure to be delivered by the power steering pressure source, as determined by a pressure limiting valve used in connection with such a source, as is well known in the art.

By making the surface of the piston facing the chambers in the cylinders large with respect to the surface of the control valve body, or spool, facing the cylinder, a comparatively long travel of the piston and a small amount of play of the steering wheel can be achieved. The ratio of control valve body face area to piston face area may be 1:10 and preferably 1:25.

The structure, organization and operation of the invention will now be described more specifically in the following detailed description with reference to the accompanying drawings, in which.

Figure 1:
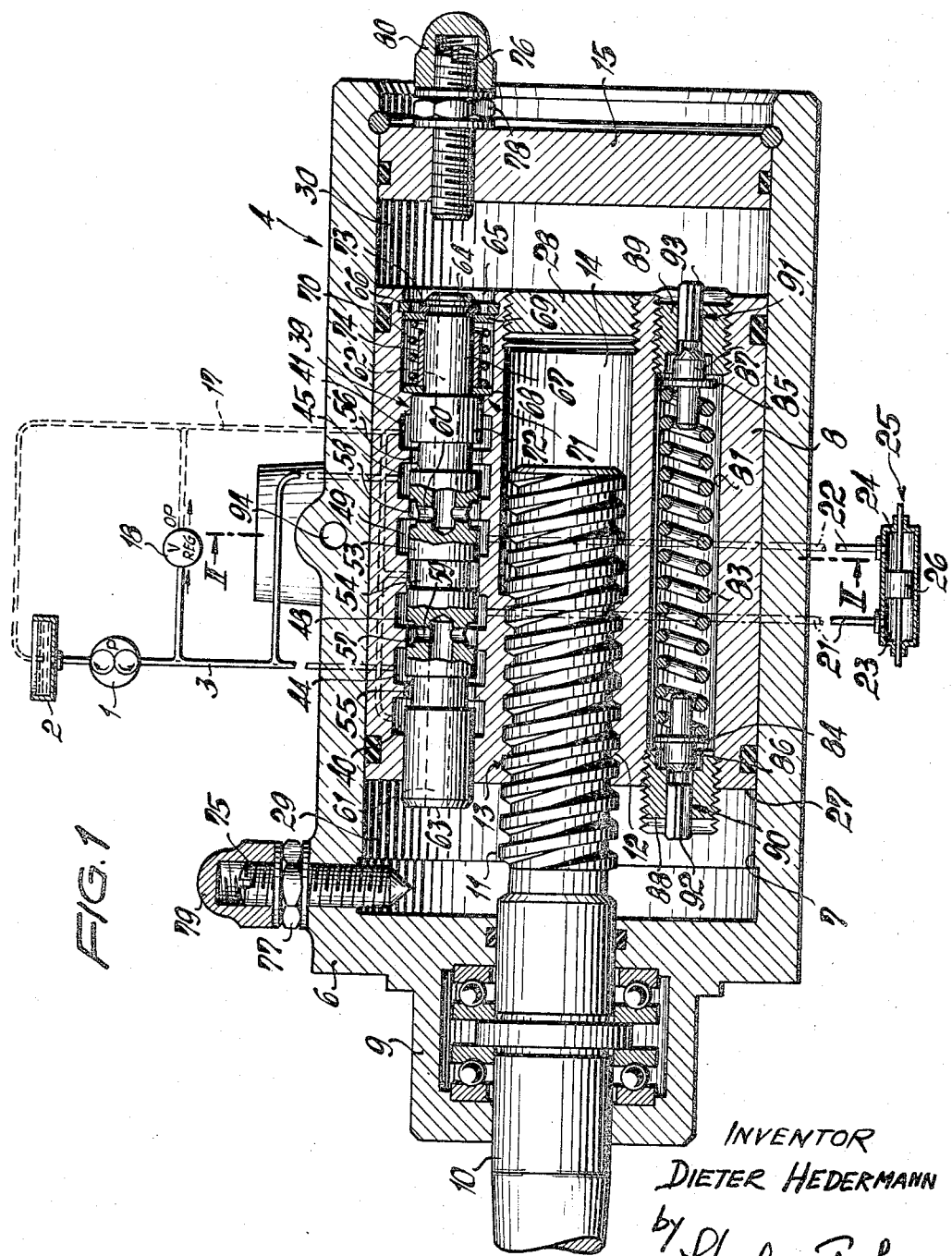
FIG. 1 illustrates a longitudinal sectional view, partly schematic, through a hydraulic steering control unit in accordance with the present invention, the auxiliary elements of the complete steering system, well known in the art by themselves, being shown schematically.

Referring now to the drawings, and more particularly to FIG. 1: The hydraulic, power assisted or power steering arrangement has a driven pump 1, well known in the art and usual with power steering units. Hydraulic power steering fluid is delivered from a sump or storage container 2 to the pump and supplied over a pressure line 3 to the steering control and drive unit of the present invention, generally shown at 4, FIG. 1. Unit 4 has a bore 5 (FIG. 2) formed in its housing 6 for connection to pressure line 3. Bore 5 terminates at the inside 7 of housing 6, formed as a cylinder with closed end walls, one of which may be removable and shown at 15, and secured to housing 6. A piston 8 is slidable within cylinder 6, and provided with sealing rings schematically indicated as well known in the art. One of the ends of the cylinder is formed with a projection 9 in which bearings are arranged to rotatably retain the steering column 10, connected to the steering wheel of the vehicle. Steering column 10, inside the cylinder, is formed with a thread 11 matching a thread 12 formed at a forward section 13 of a bore 14 within piston 8, in order to form a screw thread connection for reciprocating motion of piston 8 within cylinder 6 upon rotation of steering column 10. The interior 7 of cylinder 6 is formed with a second bore 16 (FIG. 2) to which a return line 17 can be connected, to return hydraulic fluid to sump or fluid supply 2. An over pressure relief valve 18 is connected between pump 1 and return line 17, as schematically indicated in FIG. 1 and as well known in the art.

Space 7 within cylinder 6 has another pair of bores 19, 20 (FIG. 2) to which power ducts 21, 22 can be connected, each one of these ducts leading to a side 23, 24 respectively of a steering power cylinder-piston arrangement 25, having a power piston 26 slidable therein and acting directly on the steering mechanism of the vehicle.

Figure 3:
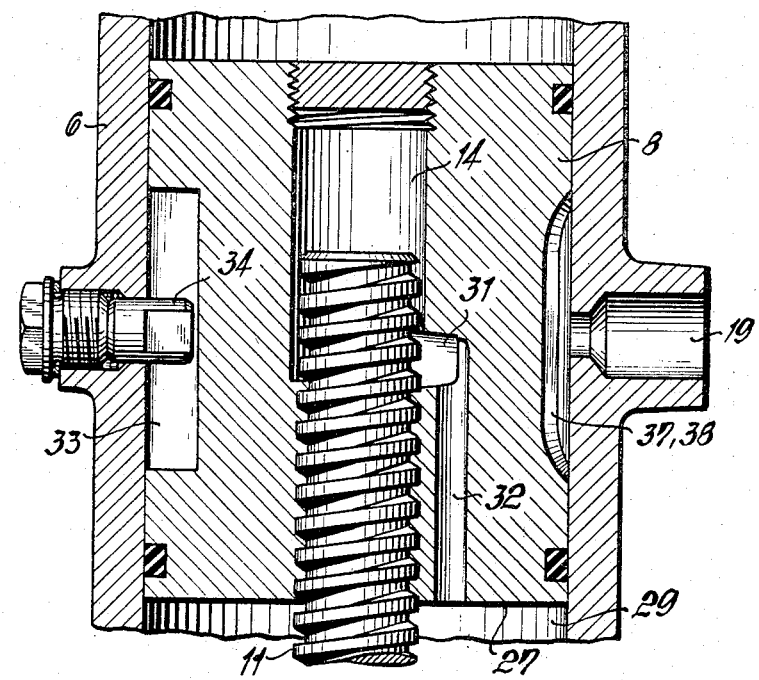
FIG. 3 is a partial sectional view along lines III—III of FIG. 2.

Piston 8 separates the cylindrical space 7 within cylinder 6 into a pair of chambers 29, 30, defined by the end walls of the cylinder and the faces 27, 28 of piston 8. The portion of the bore 14 within piston 8, which is free of thread, is formed with a notch 31 (FIG. 3). A longitudinal bore 32 leads to notch 31 from face 27 so that the blind hole 14 free from thread is always connected with the chamber 29.

Piston 8 is formed on one of its sides with a guide notch 33, engaged by a projection 34 connected to housing 6, which permits longitudinal, axial movement of the piston 8 while preventing rotation thereof. The surface of piston 8 further is provided with a longitudinal notch or connection recess 35 (FIG. 2) connected to be in fluid communication with the bore 5 in the housing, so that it, in turn, is connected to the pressure line 3 from pump 1. A second longitudinal recess or notch 36, formed on the surface of piston 8, is connected at all times with bore 16 and thus to return line 17. Piston 8 further has a pair of longitudinal notches or recesses 37, 38 each connected to be in fluid communication with bores 19, 20 respectively and thus to the power cylinder-piston arrangement 25.

Piston 8 is formed with a longitudinal bore 39 (FIG. 2) having six circumferential notches, or recesses therein (FIG. 1). The two outer circular, ring-shaped recesses 40, 41 are constantly in communication with connecting channels 42, 43 which, in turn, connect to the longitudinal notch or recesses 36 and thus with the return line 17 (see FIGS. 1 and 2). Connecting channel 43 is further connected to the guide notch 33 at the surface of piston 8 (FIG. 2) in order to provide for pressure equalization at the piston 8, somewhat symmetrically to an imaginary surface commencing at the longitudinal notch 35 and then extending approximately centrally between the longitudinal notches 37, 38.

Figure 2:
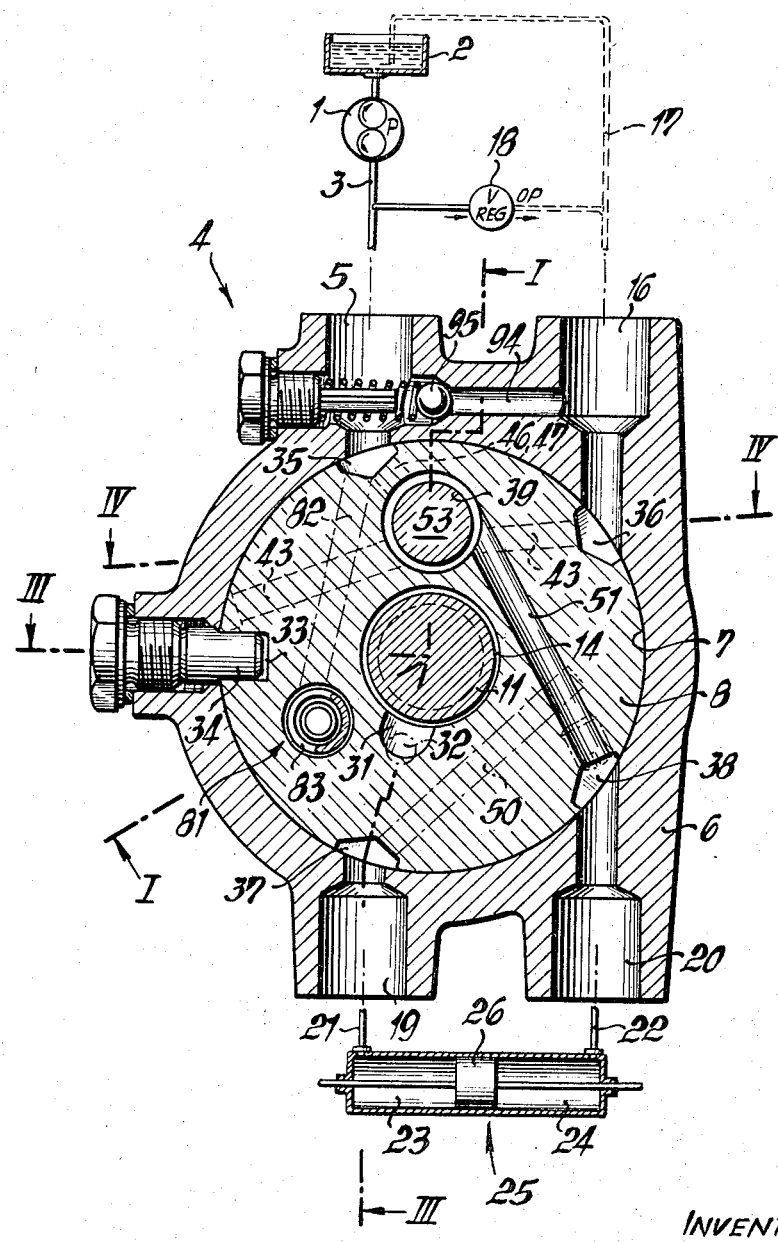
FIG. 2 is a transverse sectional view along lines II—II of FIG. 1.
Figure 4:
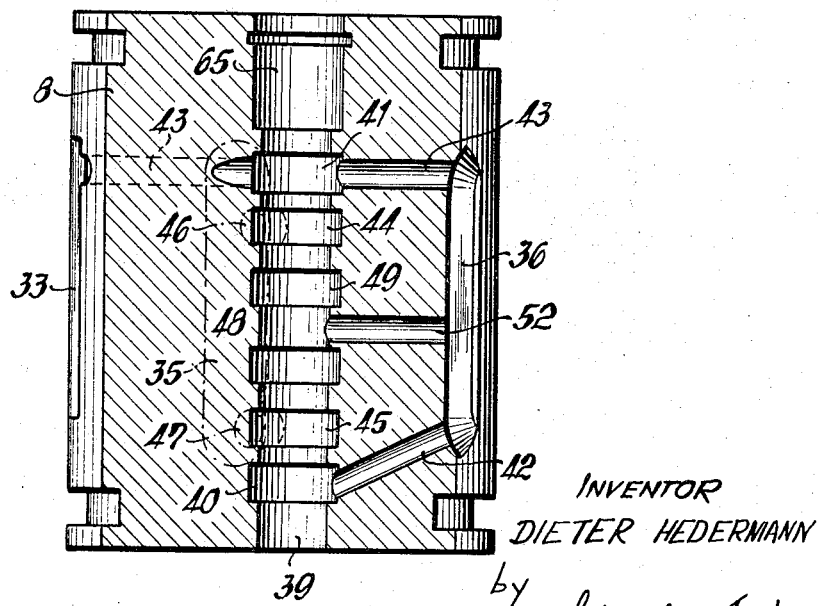
FIG. 4 is a partial sectional view through a piston of the control unit along lines IV—IV of FIG. 2.

The next circular recesses or notches 44, 45 (FIG. 1) are connected to connection channels 46, 47 which in turn connect to the longitudinal notch 35 and then to the pressure connection 5 and line 3. Each of the inner circumferential or circular recesses 48, 49 are connected to a connection channel 50, 51 (FIGS. 1, 2) each of which being connected to the longitudinal notches 37, 38 and then to the power cylinder-piston arrangement 25 over lines 21, 22, respectively. Longitudinal bore 39 has another connecting channel 52 ending herein, which functions as a third channel and which is constantly in communication with the return line 17, by connection to the longitudinal notch 36. The connections of these lines are schematically shown in FIG. 1 by solid and dashed lines respectively, while the arrangements of the various notches and connecting channels within the elements themselves are shown in FIGS. 2, 3 and 4 in more detail.

Longitudinal bore 39 within the piston 8 has a control valve body 53, often referred to as a valve spool, located slidably therein and having a fluid tight fit with respect to the walls of bore 39 which are not recessed by notches. Spool 53 is formed with a central circumferential recess 54, connected at all times and regardless of position of the spool 53 within piston 8 with the return channel 52. A pair of circumferential grooves 55, 56 are arranged on the spool 53 in such a manner that they are connected either to the return line 17 over recesses 40, 41 or are in fluid communication with recesses 44, 45 as well as with return line recesses 40, 41. It will be recalled that circumferential recesses 44, 45 are connected to pressure line 3. Between grooves 55, 54 and grooves 56, 54 respectively, a further circumferential groove 57, 58 is arranged, which is connected either to the pressure line 3 over circumferential recesses 44, 45 within piston 8, or with recesses 48, 49 and thus the power piston lines 21, 22, depending upon the position of spool 53 within piston 8.

Spool 53 is formed with a transverse bore, 59, 60, in the region of circumferential grooves 57, 58 respectively. A longitudinal, axial blind bore 61, 62 is formed from respective ends 63, 64 into the spool body and communicating with the cross bores 59, 60. Longitudinal bore 39 within piston 8 is enlarged at one end, as shown at 65 (right side FIG. 1) and provided with a stop ring 66 which may be snapped into a groove formed in piston 8. Terminal piece 67 of spool 53 is provided with a pair of limit washers 68, 69 spaced by means of a compression spring 70. Spring 70 presses, in accordance with the position of spool 53, either washer 68 against a shoulder 71 in the longitudinal bore 39 and/or against region 72 of spool 53; further, it bears against washer 69 and thus against ring 66 and/or a stop 73 secured to spool end 67. A sleeve 74 is slipped over spool end 67 and located beneath spring 70 in order to limit the travel of spool 53 within bore 39 in an axial direction.

A stop member 76, lengthwise adjustable and secured in position by a lock nut 78, is arranged in removable cover 15. A second stop 75, having a bevelled end is arranged at the other end of cylinder 7 and extending into the housing, likewise longitudinally adjustable and secured by a lock washer 77. Both stop members 75, 78 are secured against accidental change in position by means of cap nuts 79, 80. Stop members 75, 76 are adjusted to extend into the respective sides of chambers 29, 30 within path of travel of spool 53 in piston 8. Engagement of the face surfaces 63, 64 of spool 53, as determined by the extent of projection of stop members 75, 76 into the chambers 29, 30 of cylinder 6 provides for mechanical displacement of spool 53 before piston 8 has reached its limit position of travel.

Piston 8 is formed with an additional bore 81 (FIG. 2) permanently connected by means of a longitudinal notch 82 to longitudinal notch 35 formed on the surface of piston 8, and in turn in constant communication with pressure line 3. A pair of leakage compensation valves, one on either end of the bore 81 (FIG. 1) and each consisting of a flanged body 86, 87, fitting into an adjustable valve seat 88, 89 and screwed into bore 81, are retained in position by means of a common spring 83. Spring 83 bears against flanges 84, 85 of the valve elements. Valve bodies 88, 89 are adjustable in their position within piston 8, so that they project more or less beyond the piston within the chambers 29, 30. Each valve element 88, 89 has a plunger attached thereto shown at 92, 93 respectively, which is formed with a longitudinal bore 90, 91. Plungers 92, 93 extend beyond the valve bodies 88, 89 into chambers 29, 30, so that the plungers will bear against the faces of the cylinder 6 and open the valves before piston 8 has reached the limit of its travel.

As best seen in FIG. 2, pump housing 6 contains a suction valve 95 interconnecting bores 16 and 5 and thus return line 17 and pressure line 3. Suction valve 5 is connected to bore 16 over transverse channel 94.

From the construction of the valve unit as above described, several fluid circuits will become apparent.

*Fluid circuit I* (connection of hydraulic fluid from pump 1 and return, with control valve body 53 in centered or neutral position as shown in FIG. 1): pump 1—line 3—bore 5 (FIG. 2)—longitudinal recess or groove 35 (FIG. 2)—connecting channels 46, 47 (FIGS. 2, 4)—circular recesses or rings 44, 45—grooves 55, 56—recesses 40, 41—connecting channels 42, 43 (FIG. 2)—longitudinal notch or channel 36 (FIGS. 2, 4)—bore 16 (FIG. 2)—line 17 and return to pump 1.

*Circuit II* (supply of fluid to power cylinder-piston assembly 25; control valve body 53 in centered or neutral position as shown in FIG. 1): power lines 21, 22 from sides 23, 24 of power cylinder assembly—bores 19, 20 (FIG. 2)—longitudinal channels 37, 38—connecting channels 50, 51 (FIG. 2)—circular recesses 48, 49 (FIG. 1)—adjacent circular grooves 57, 58—cross bores 59, 60—axial bores 61, 62 to chambers 29, 30.

Chambers 29, 30 are closed off from connection to any one of the recesses 44, 45 of circuit I by the ends of spool body 53. The power lines 21, 22 are thus closed off from connection to pump 1.

If only small reaction forces are transmitted from the wheels, for example when driving rapidly on good highways, no power assistance is necessary to steer the vehicle. Force transmitted to sides 23, 24 of piston 26 from the wheels, and then to chambers 29, 30 (circuit II) can readily be counteracted by the driver by holding the piston 8 in position by means of the steering wheel connected to column 10. Thus, power piston 26 will likewise be steady.

If, after having made a turn, the driver releases the steering wheel to let it spin back to central position, the wheels can return to straight direction under the forces generated by the toe-in of the wheels. Sides 23, 25 of the power piston will react and supply hydraulic fluid to chambers 29, 30 respectively and thus return the piston 8, and with it the steering column 10 to the central position.

If the driver wishes to cut the wheels and the reactive force from the wheels is small, fluid circuit II above referred to will cause the wheels to follow the motion of the steering wheel. Steering column 10, upon rotation, moves piston 8 within the housing changing the relative size of chambers 29, 30. If the pressure difference is small the fluid circuit II will move power piston 26. Valve body 53 will remain in the position of FIG. 1. When the ratio of the surfaces of faces 27, 28 of piston 8 is large with respect to the surface of end faces 63, 64 of valve body 53, and the force of spring 70 is suitably chosen, piston 8 can be displaced over small distances or against small reactive forces before valve body 53 will move from its center or neutral position. A suitable ratio of piston end surface to valve body end surface is 1:10, or more.

By suitable choice of spring pressure, and sizes of surfaces, pressure forces arising within 29, 30 can readily be balanced.

Circuit III is the fluid circuit established for power assisted steering. It will become effective when the resistance of the wheels to cutting is substantial, for example, with a rough road surface or in parking. If the driver turns steering column 10, piston 8 will move within cylinder 6; let it be assumed piston 8 is moved to the left in FIG. 1, that is into chamber 29. A pressure increase in chamber 29 will result. This pressure increase will be transmitted over circuit II to side 23 of assembly 25. When the pressure rises so that on surface 63 of valve body 53 substantial forces are applied, which forces are greater than the resistance of spring 70, valve body 53 will shift out of its neutral center position as shown in FIG. 1, that is it will slide to the right with respect to piston 8. Part of circuit II will still be maintained, however: chamber 29—bore 61—cross bore 59—circular groove 57—circular recess 48—connecting channel 50—longitudinal channel 37 (FIG. 2)—bore 19—line 21—side 23 of piston 26. However, chamber 30 will be disconnected from side 24 of power piston 26; that is, the return line of circuit II is interrupted; instead, there will be

*Circuit III*: Side 24—line 22—bore 20—longitudinal channel 38—connecting channel 51—circular recess 49—central groove 54—return line 52—longitudinal notch 36—bore 16—pump return line 17—hydraulic supply 2 and then pump 1.

*Circuit IV* (to supply fluid from pump 1 to assist in steering): pump 1—line 3—longitudinal recess 35—channel 47—recess 45 (see circuit I)—groove 58—bores 60, 62—chamber 30.

Thus pressure fluid will be supplied to chamber 30; the pressure will increase therein assisting in moving piston 8 by means of steering column 10 further into chamber 29 until the force on side 64, that is to the right of body 53, together with the force of spring 70 brings valve body 53 back into center position again. When spool 53 is again in center position, the chamber 30 is again closed off from the pressure supply and connected to side 24 of the power cylinder-piston unit 25 (circuit I).

When steering in the opposite direction, the circuits are similar, and symmetrical with respect to the other sides of the grooves and recesses of the spool and piston 8 respectively.

The power assistance for steering depends not only on the size ratios of the face of piston 8 and of valve body 53, but also on the force of spring 70, and influences of tolerances and closeness of fit of the parts themselves, causing internal leakage. A certain angular deflection of steering column 10 is necessary in order to overcome play before power assistance to steering takes over. In order to reduce this play to as small an angle as possible, the aforementioned ratio of 1:10 for area of both body ends to piston faces is recommended. An angle of play of 2.5° can be obtained with commercial tolerances in manufacture of the piston, its fit within cylinder 6, and the valve body 53. A total displacement of the piston 8 can thus be obtained which is small with respect to the displacement of known drives, but yet is still great enough to avoid extreme precision in manufacture and thus expense in production, while yet providing rapid and trouble-free power assistance when the reactive force from the wheels exceeds a certain minimum value.

Steering is not depending upon supply of pressure fluid from pump 1. If it is desired to steer the vehicle in spite of failure of pump 1, or with the engine turned off, for example during towing, the control unit 4 will operate as a fluid pressure supply pump itself, powered manually. The fluid circuits will be the same as those under power steering conditions (circuits three and four above). Since, however, pump 1 does not supply pressure fluid, the suction relief valve 95 will supply fluid from bore 16 (that is from suction line 17—FIG. 2) over to pressure bore connection 5. Thus fluid can enter from sump 2 through return line 17.

As an example, let it be assumed that the driver turns steering column 10 in a direction so that the piston 8 is driven towards the right in FIG. 1, that is compressing the fluid in chamber 30. When the pressure in chamber 30 exceeds the sum of the pressure differential between pressure in chambers 30 and 29, and the force of spring 70, fluid pressure within chamber 30 acting on face 64 of spool 53 forces spool 53 towards the left, that is in the direction of chamber 29. Connection between the pressure line 3 and circular grooves 44, 45 with recesses 40, 41 is then interrupted. Side 23 of the power cylinder 26 is thus separated from chamber 29 and connected over recess 54 which connecting channel 52 leading towards the return line 17. Side 23 of the power piston 26 is without pressure and the higher pressure acting on chamber 30 and on side 24 of the cylinder 25 pushes piston 26 towards side 23 within cylinder 25.

Chamber 29 is, however, still connected through circular recesses 44 to pressure line 3. Since, however, no pressure fluid is available from pump 1, fluid is supplied through line 3 over the suction valve 95 from sump 2 through reverse flow through line 17 and then into cylinder 25.

In order to straighten out the wheels, the driver has to move steering column 10, and thus piston 8, towards the left, being assisted by the higher pressure within chamber 30. Pressure will thus rise within chamber 29, and drop in chamber 30. When the pressure differential between chambers 29, 30 is less than the force of spring 70, spool body 53 returns to its neutral position. Both chambers 29, 30 are then again connected to respective sides 23, 24 of the power cylinder 25.

Leakage fluid arising within space 7 of cylinder 6 may cause displacement of power piston 26 within power cylinder 25. In order to retain the vehicle in a straight line, it may be necessary to turn the steering column and change the position of the piston 8 within the housing 6 so that it will not be centered any more. Thus, it is possible that, upon steering towards one side, full wheel cut and minimum turning radius can no longer be obtained, since piston 8 reaches its limit position within bore 7 before the wheels have been fully deflected. In order to still obtain full deflection of wheels, leakage compensation values 86, 88; 87, 89 are provided within bore 81 of piston 8. Just before piston 8 could hit against the end wall of chamber 29, or against cover 15, plungers 92, 93 respectively of the leakage compensation valves 86, 88; 87, 89 are depressed, admitting hydraulic fluid to bore 81. Fluid within bore 81 is led through channel 82 to the longitudinal notch or groove 35 which is, in turn, always connected to pressure line 3, on the surface of piston 8. Let it be assumed that plunger 92 of valve body 86 is engaged by the wall closing off chamber 29. When valve body 86 lifts off its matching valve seat 88, control valve spool 53 is engaged at its face 63 with stop 75, moving spool body 53 from its neutral position. Pressure fluid supplied by pump 1 thus no longer flows without pressure from circular recesses 44, 45 through recesses 40, 41 and returns to line 17, but rather is guided by pressure line 3 through longitudinal notch 35, channel 82, bore 81, open leakage compensation valve 86, 88 to the cylinder chamber 29. Pressure within chamber 29 will rise. Pressure will likewise rise at side 23 of the power steering cylinder 25. Side 24 of the power cylinder 25 is connected with the return line (recess 49—groove 54—channel 52—longitudinal recess 36—bore 16—return line 17) so that hydraulic fluid at side 24 may return to the pump. The power piston 26 will thus move towards side 24. Chamber 30 is connected to the pressure line 3 likewise by means of recess 45 and bores 60, 62. Hydraulic fluid under pressure entering into chamber 30 causes rise of pressure there, maintaining piston 8 in its position while the power piston 26 continues to move, until it, and with it the wheels, have reached their maximum deflecting position corresponding to the final limit of the position of piston 8. Turning the steering wheel thus from lock to lock position then resets and clears the steering unit and realigns steering wheel and steered wheels.

If it is desired to limit the deflection of the steered wheels, that is to limit the deflection to less than that possible under control of unit 4, a slight return movement of the steering column, in the straightening direction after the wheels have reached their limit, will reestablish control of the unit. Piston 8 will be moved slightly, the relative forces of pressures within the chambers 29, 30 will be decreased to such an extent that valve body 53 is brought back to its center, or neutral position, by the pressure of spring 70, to be retained in its center position.

The leakage compensation valves 86, 88; 87, 89 additionally function as pressure limiting valves and thus have an additional safety function. If heavy deflections are transmitted from the wheels to wheel piston 26, such as may arise upon the wheel hitting a rock, or a hole, so that piston 26 is suddenly pushed to a side, for example towards side 23, a sudden pressure surge will arise in chamber 29 connected to side 23 of the power cylinder 25. Valve body 86 will be lifted from its seat 88, and pressure fluid can escape from the chamber 29 through open valve 86, 88 within bore 81, channel 82 and longitudinal recess 35 and back to the pressure line 3, from which it can be relieved by over pressure valve 18 into the return line 17. The adjustment of valves 18 and 86, 88; 87, 89 relative to each other and to the entire steering arrangement is preferably done such that the opening pressure of leakage compensation valves 86, 88; 87, 89 is at least two and one half times as great as that of the over pressure valve 18.

Other ratios of relative surface areas, spring forces, and relative pressures may be used, as determined by manufacturing tolerances, tightness and fits of the relatively movable parts.

I claim:

1. Hydraulic steering control unit for automotive vehicles having hydraulic connections for connection to a fluid pressure source and hydraulic connections for a power piston and cylinder adapted for operative association with the wheels of a vehicle to be steered comprising a housing defining a closed cylinder;
   a piston within said cylinder and arranged for longitudinal displacement therein in accordance with rotation of the steering column of the vehicle, said piston defining a pair of chambers between either end thereof and the end walls of the cylinder;
   a control valve body movably located within said piston and having fluid communication recesses formed thereon;
   said control valve body having end faces exposed to fluid pressure in said chambers and being movable from said central position by differential pressure in said chambers; fluid channels formed in said piston and said housing and selectively communicating with said fluid communication recesses to form a first fluid circuit between said chambers and said power cylinder connections when the control valve body is in its central position, and to form fluid circuits between said chambers, said power cylinder connection and selectively said fluid pressure source connection upon displacement of said body from said central position; and
   spring means associated with said valve body and retaining said valve body in a predetermined central position within said piston in opposition to small pressure differentials within said chambers whereby small steering forces, less than the force of the spring, will be transmitted directly by compression of fluid in one of said chambers and transmission of the thus-compressed fluid to the power piston and cylinder, while substantial forces causing movement of the valve body will establish connection of said chambers with said fluid pressure source.

2. Unit as claimed in claim 1 wherein the surface of said piston facing said chamber is at least ten times as great as the surface of said control valve body facing said chamber.

3. Unit as claimed in claim 1 wherein said piston is formed with an axially extending bore, said control valve body is in form of a cylindrical spool having circumferential grooves cut therein and located within said bore, said fluid channels formed in said piston being connected to said power piston connections and said fluid pressure source connections and arranged to establish fluid communication regardless of the position of said piston within said housing.

4. Unit as claimed in claim 3 wherein said valve body has a pair of blind axial bores, and transverse bores, said transverse bores connecting selected surface regions of said valve body to said axial bores, and said axial bores connecting with said chambers.

5. Unit as claimed in claim 1 including a leakage compensation valve associated with each said chamber, said leakage compensation valves being located to open upon travel of said piston toward a limiting position with any one of said chambers, said leakage compensation valves establishing fluid communication between the chamber occupied by said piston and said fluid pressure source connection.

6. Unit as claimed in claim 5 wherein said piston is formed with an axial bore, and a pair of leakage compensation valve members are located coaxially at opposite ends of said bore, said bore being in communication with said fluid pressure source connection; and a spring is provided simultaneously biasing both said valve members into closed position.

7. Unit as claimed in claim 5 wherein said leakage compensation valves are spring loaded to act as over pressure valves, and an over pressure relief valve is provided associated with the pressure and return connections for said fluid pressure source, said over pressure relief valve being arranged for a pressure less than the pressure setting of said liquid compensation valves as determined by said spring loading.

8. Unit as claimed in claim 1 including means limiting the displacement of said valve body within said piston.

9. Unit as claimed in claim 1 including stop means arranged in the path of travel of said valve body with respect to said housing, said stop means causing displacment of said body with respect to said piston in advance of the terminal positions of said piston within said cylinder.

10. Unit as claimed in claim 1 including a suction valve arranged between the pressure and the return connections for said fluid pressure source to provide for supply of fluid from the return connection to the pressure connection independently of the operation of said pressure source delivering fluid under pressure.

11. Unit as claimed in claim 10 wherein said suction valve is arranged in said housing and interconnecting said hydraulic connections.

References Cited
UNITED STATES PATENTS 3,002,501 10/1961 Banker.
3,092,083 6/1963 Sheppard _____ 180—79.2 XR EDGAR W. GEOGHEGAN, *Primary Examiner.*